United States Patent
Tetsuka et al.

(10) Patent No.: US 11,407,474 B2
(45) Date of Patent: Aug. 9, 2022

(54) OPERATING DEVICE FOR HUMAN-POWERED VEHICLE

(71) Applicant: SHIMANO INC., Sakai (JP)

(72) Inventors: Toshio Tetsuka, Sakai (JP); Eiji Mishima, Sakai (JP); Takehiko Nakajima, Sakai (JP)

(73) Assignee: SHIMANO INC., Sakai (JP)

( * ) Notice: Subject to any disclaimer, the term of this patent is extended or adjusted under 35 U.S.C. 154(b) by 334 days.

(21) Appl. No.: 16/525,523

(22) Filed: Jul. 29, 2019

(65) Prior Publication Data
US 2021/0031871 A1 Feb. 4, 2021

(51) Int. Cl.
| | |
|---|---|
| *B62M 6/45* | (2010.01) |
| *B62K 23/02* | (2006.01) |
| *B62J 99/00* | (2020.01) |
| *B62J 45/00* | (2020.01) |
| *B62J 50/20* | (2020.01) |
| *B62J 45/10* | (2020.01) |

(52) U.S. Cl.
CPC ............... *B62M 6/45* (2013.01); *B62J 99/00* (2013.01); *B62K 23/02* (2013.01); *B62J 45/00* (2020.02); *B62J 45/10* (2020.02); *B62J 50/20* (2020.02)

(58) Field of Classification Search
CPC . B62K 23/02; B62J 45/00; B62J 99/00; B62J 50/20; B62L 3/02; B62M 25/08; B62M 6/45
See application file for complete search history.

(56) References Cited

U.S. PATENT DOCUMENTS

| | | | |
|---|---|---|---|
| 5,676,021 A | 10/1997 | Campagnolo | |
| 7,703,350 B2 * | 4/2010 | Fujii | B62K 23/06 74/501.6 |
| 7,730,803 B2 * | 6/2010 | Takamoto | B62M 25/08 74/473.12 |
| 8,723,659 B2 | 5/2014 | Tetsuka | |
| 8,781,679 B2 * | 7/2014 | Ikemoto | B62K 25/28 701/37 |
| 8,781,680 B2 * | 7/2014 | Ichida | B62J 99/00 701/37 |
| 8,886,417 B2 * | 11/2014 | Jordan | B62M 9/132 701/51 |
| 8,909,424 B2 * | 12/2014 | Jordan | H04W 74/08 701/36 |
| 8,931,365 B2 * | 1/2015 | Fujii | B62M 25/08 74/502.2 |

(Continued)

FOREIGN PATENT DOCUMENTS

| | | |
|---|---|---|
| CN | 107303931 | 10/2017 |
| CN | 108116615 | 6/2018 |

(Continued)

*Primary Examiner* — Tony H Winner
*Assistant Examiner* — Michael R Stabley
(74) *Attorney, Agent, or Firm* — Mori & Ward, LLP

(57) ABSTRACT

An operating device for a human-powered vehicle comprises a base member, an informing unit, and an operating member. The base member is configured to be mounted to a handlebar. The informing unit is configured to inform a user of first information relating to an assist driving unit configured to assist a human power. The operating member is movably coupled to the base member to control a component different from the assist driving unit.

15 Claims, 10 Drawing Sheets

(56) References Cited

U.S. PATENT DOCUMENTS

| | | | |
|---|---|---|---|
| 9,229,712 B2* | 1/2016 | Takamoto | B62K 25/04 |
| 9,399,500 B1* | 7/2016 | Hashimoto | G08C 17/02 |
| 9,463,845 B2* | 10/2016 | Kuroda | F16H 63/304 |
| 9,522,714 B2* | 12/2016 | Komatsu | B62M 25/08 |
| 9,682,743 B2* | 6/2017 | Miyoshi | B62J 99/00 |
| 10,363,992 B2* | 7/2019 | Watarai | B62M 9/122 |
| 10,457,350 B2* | 10/2019 | Kasai | B62K 23/02 |
| 10,513,307 B2* | 12/2019 | Komatsu | B62L 3/023 |
| 10,556,634 B2* | 2/2020 | Komatsu | B62J 1/08 |
| 10,556,638 B2* | 2/2020 | Sato | B62M 9/12 |
| 10,807,671 B2* | 10/2020 | Usui | B62M 6/45 |
| 2009/0315692 A1* | 12/2009 | Miki | B62K 23/02 340/432 |
| 2012/0221203 A1* | 8/2012 | Ichida | B62K 25/04 701/37 |
| 2012/0253600 A1* | 10/2012 | Ichida | B62K 19/36 701/37 |
| 2012/0253601 A1* | 10/2012 | Ichida | B60G 17/0195 701/37 |
| 2014/0070930 A1* | 3/2014 | Hara | B62J 3/00 340/432 |
| 2014/0260752 A1 | 9/2014 | Mueller et al. | |
| 2014/0345411 A1* | 11/2014 | Miki | B62M 25/08 74/473.12 |
| 2015/0284049 A1* | 10/2015 | Shipman | B62K 23/06 74/473.12 |
| 2017/0305395 A1 | 10/2017 | Komatsu et al. | |
| 2018/0148127 A1 | 5/2018 | Sato et al. | |
| 2019/0185093 A1 | 6/2019 | Nishino | |

FOREIGN PATENT DOCUMENTS

| | | |
|---|---|---|
| CN | 207773360 U | 8/2018 |
| CN | 110015362 | 7/2019 |
| JP | 10-119874 | 5/1998 |
| JP | 2018-89989 | 6/2018 |

\* cited by examiner

OPERATING DEVICE FOR HUMAN-POWERED VEHICLE

BACKGROUND OF THE INVENTION

Field of the Invention

The present invention relates to an operating device for a human-powered vehicle.

Discussion of the Background

A human-powered vehicle includes an operating unit configured to operate an electric component.

SUMMARY OF THE INVENTION

In accordance with a first aspect of the present invention, an operating device for a human-powered vehicle comprises a base member, an informing unit, and an operating member. The base member is configured to be mounted to a handlebar. The informing unit is configured to inform a user of first information relating to an assist driving unit configured to assist a human power. The operating member is movably coupled to the base member to control a component different from the assist driving unit.

With the operating device according to the first aspect, it is possible to inform the user of the first information relating to the assist driving unit using the informing unit. Thus, the user can easily recognize a state of the assist driving unit.

In accordance with a second aspect of the present invention, the operating system according to the first aspect is configured so that the first information includes at least one of a remaining level of a power storage, an ON-OFF state of the assist driving unit, and an assist mode of the assist driving unit.

With the operating device according to the second aspect, it is possible to inform the user of at least one of the remaining level of the power storage, the ON-OFF state of the assist driving unit, and the assist mode of the assist driving unit. Thus, the user can reliably recognize the state of the assist driving unit.

In accordance with a third aspect of the present invention, the operating system according to the second aspect is configured so that the informing unit is configured to output at least one of the remaining level of the power storage, the ON-OFF state of the assist driving unit, and the assist mode of the assist driving unit.

With the operating device according to the third aspect, it is possible to inform the user of at least one of the remaining level of the power storage, the ON-OFF state of the assist driving unit, and the assist mode of the assist driving unit. Thus, the user can reliably recognize the state of the assist driving unit.

In accordance with a fourth aspect of the present invention, the operating system according to the third aspect is configured so that the informing unit is configured to output second information different from the first information.

With the operating device according to the fourth aspect, it is possible to inform the user of the second information different from the first information. Thus, the user can reliably recognize the state of the human-powered vehicle.

In accordance with a fifth aspect of the present invention, the operating system according to the fourth aspect is configured so that the second information includes a speed of the human-powered vehicle. The informing unit is configured to output the speed of the human-powered vehicle.

With the operating device according to the fifth aspect, it is possible to inform the user of the speed of the human-powered vehicle.

In accordance with a sixth aspect of the present invention, the operating system according to any one of the first to fifth aspects is configured so that the base member includes a coupling end configured to be coupled to the handlebar, a free end opposite to the coupling end, and a grip portion provided between the coupling end and the free end.

With the operating device according to the sixth aspect, it is possible to inform the user of the state of the human-powered vehicle such as an E-bike.

In accordance with a seventh aspect of the present invention, the operating system according to the sixth aspect is configured so that the informing unit is configured to be provided to at least one of the coupling end, the free end, and the grip portion.

With the operating device according to the seventh aspect, it is possible to reliably inform the user of the state of the human-powered vehicle such as an E-bike.

In accordance with an eighth aspect of the present invention, the operating system according to any one of the first to seventh aspects further comprises an assist operating switch and a controller. The assist operating switch is configured to receive a user assist operation input. The controller is configured to generate an assist control signal based on the user assist operation input.

With the operating device according to the eighth aspect, it is possible to operate the assist driving unit using the assist operating switch with informing the user of the state of the assist driving unit.

In accordance with a ninth aspect of the present invention, the operating system according to the eighth aspect is configured so that the controller is configured to control the informing unit based on the first information.

With the operating device according to the ninth aspect, it is possible to reliably output the first information relating to the assist driving unit through the informing unit.

In accordance with a tenth aspect of the present invention, the operating system according to the eighth or ninth aspect is configured so that the controller is configured to receive the first information from the assist driving unit.

With the operating device according to the tenth aspect, it is possible to reliably obtain the first information from the assist driving unit.

In accordance with an eleventh aspect of the present invention, the operating system according to any one of the eighth to tenth aspects further comprises a communication port configured to be connected to an electric cable. The communication port is electrically connected to the controller to transmit the assist control signal via the communication port.

With the operating device according to the eleventh aspect, it is possible to utilize the communication port for communication between the operating device and the assist driving unit.

In accordance with a twelfth aspect of the present invention, the operating system according to any one of the eighth to eleventh aspects is configured so that the controller includes a wireless communicator electrically connected to the controller to wirelessly transmit the assist control signal.

With the operating device according to the twelfth aspect, it is possible to utilize wireless technology for communication between the operating device and the assist driving unit.

In accordance with a thirteenth aspect of the present invention, the operating system according to any one of the first to twelfth aspects is configured so that the informing unit is configured to inform the user of the first information at least one of visually, auditory and haptically.

With the operating device according to the thirteenth aspect, it is possible to reliably inform the user of the first information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
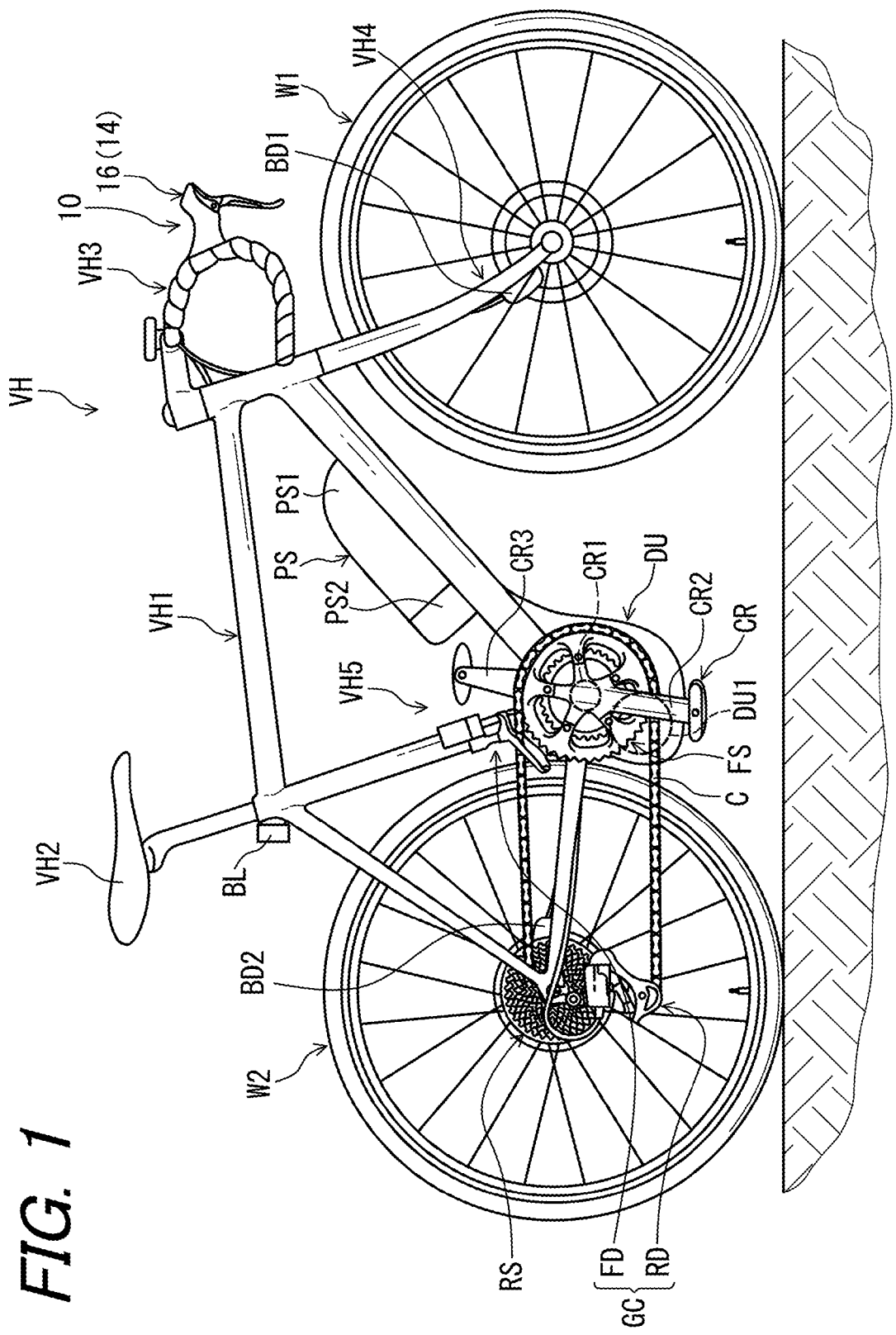
FIG. 1 is a side elevational view of a human-powered vehicle including an operating device in accordance with a first embodiment.

The embodiment(s) will now be described with reference to the accompanying drawings, wherein like reference numerals designate corresponding or identical elements throughout the various drawings.

First Embodiment

Referring initially to FIG. 1, a human-powered vehicle VH includes an operating system 10 in accordance with a first embodiment. For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VH has at least one wheel. In this embodiment, the human-powered vehicle VH preferably has a smaller size than that of a four-wheeled automobile. However, the human-powered vehicle VH can have an arbitrary size. Examples of the human-powered vehicle VH include a bicycle, a tricycle, and a kick scooter. In this embodiment, the human-powered vehicle VH is a bicycle. An electric assisting system including an electric motor can be applied to the human-powered vehicle VH (e.g., the bicycle) to assist muscular motive power of the user. Namely, the human-powered vehicle VH can be an E-bike. While the human-powered vehicle VH is illustrated as a road bike, the operating system 10 can be applied to time trial bikes or any type of human-powered vehicles.

The human-powered vehicle VH further includes a vehicle body VH1, a saddle VH2, a handlebar VH3, a front fork VH4, a drive train VH5, a first brake device BD1, a second brake device BD2, a first wheel W1, and a second wheel W2. The front fork VH4 is rotatably mounted to the vehicle body VH1. The handlebar VH3 is secured to the front fork VH4. The first wheel W1 is rotatably coupled to the front fork VH4. The second wheel W2 is rotatably coupled to the vehicle body VH1. The first brake device BD1 is configured to apply a braking force to the first wheel W1. The second brake device BD2 is configured to apply a braking force to the second wheel W2.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle VH2 or a seat) in the human-powered vehicle VH with facing the handlebar VH3. Accordingly, these terms, as utilized to describe the operating system 10 or other components, should be interpreted relative to the human-powered vehicle VH equipped with the operating system 10 as used in an upright riding position on a horizontal surface.

The drive train VH5 includes a crank assembly CR, a front sprocket assembly FS, a rear sprocket assembly RS, a chain C, and a gear changing device GC. The front sprocket assembly FS is secured to the crank assembly CR and includes a plurality of front sprockets. The rear sprocket assembly RS is rotatably mounted to the vehicle body VH1 and includes a plurality of rear sprockets. The chain C is engaged with the front sprocket assembly FS and the rear sprocket assembly RS. The gear changing device GC includes a gear changing unit FD and a gear changing unit RD. The gear changing unit FD is mounted to the vehicle body VH1 and is configured to shift the chain C relative to the front sprocket assembly FS to change a gear position of the gear changing unit FD. The gear changing unit RD is mounted to the vehicle body VH1 and is configured to shift the chain C relative to the rear sprocket assembly RS to change a gear position of the gear changing unit RD. The gear changing device GC has a gear ratio. The gear ratio is a ratio of a rotational speed of the rear sprocket assembly RS to a rotational speed of the front sprocket assembly FS. In this embodiment, the gear changing unit FD includes a derailleur. The gear changing unit RD includes a derailleur. However, each of the gear changing unit FD and the gear changing unit RD can include another device such as an internal gear hub. At least one of the gear changing units FD and RD can be omitted from the drive train VH5. The human-powered vehicle VH includes a speed sensor SS. The speed sensor SS is configured to sense a rotational speed of the second wheel W2.

The human-powered vehicle VH includes an assist driving unit DU configured to assist a human power. The assist driving unit DU includes an assist motor DU1 configured to impart propulsion to the human-powered vehicle VH. The crank assembly CR includes a crank axle CR1 and crank arms CR2 and CR3. The crank arms CR2 and CR3 are secured to the crank axle CR1. For example, the assist driving unit DU is configured to apply an assist driving force to the crank assembly CR.

Figure 2:
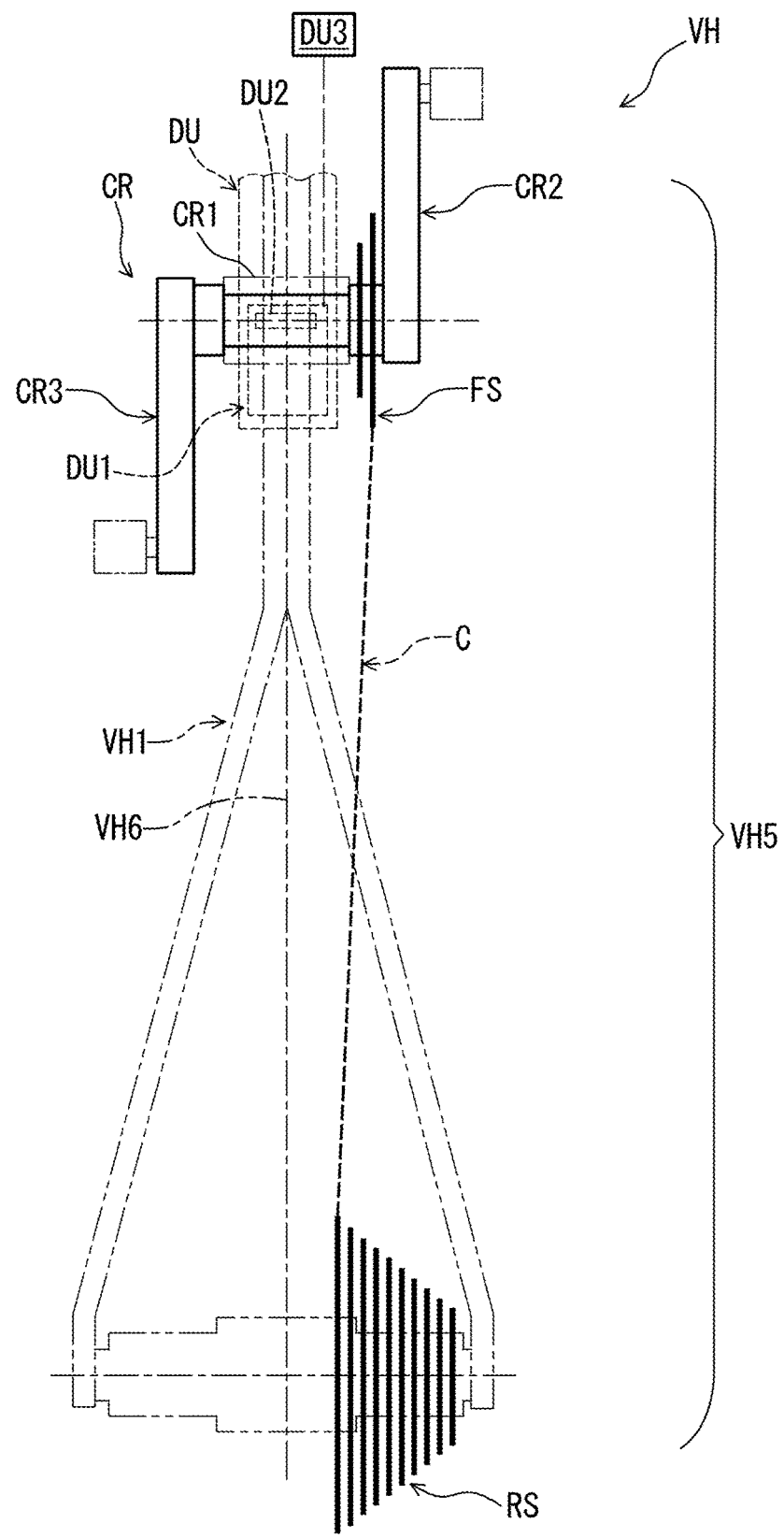
FIG. 2 is a schematic diagram of a drive train of the human-powered vehicle illustrated in FIG. 1.

As seen in FIG. 2, the assist driving unit DU comprises a pedaling-force sensor DU2 configured to sense a pedaling force applied to the crank assembly CR from a rider. The assist driving unit DU includes a motor controller DU3 configured to control the assist motor DU1 to add the assist driving force to the drive train VH5 based on an assist ratio and the pedaling force sensed by the pedaling-force sensor DU2. The motor controller DU3 is configured to select and/or calculate the assist ratio. However, the motor controller DU3 can be configured to control the assist motor DU1 to add the assist driving force to the drive train VH5 regardless of the assist ratio and/or the pedaling force. For example, the motor controller DU3 is configured to control the assist motor DU1 to add the assist driving force to the crank assembly CR based on a user input received by the operating system 10.

As seen in FIG. 1, the human-powered vehicle VH includes a power storage PS and a brake lamp BL. The power storage PS is electrically connected to the assist driving unit DU, the gear changing device GC, and the brake lamp BL to supply electricity to the assist driving unit DU, the gear changing device GC, and the brake lamp BL. The power storage PS includes a battery PS1 and a battery holder PS2. Examples of the battery PS1 include a primary battery such as a lithium manganese dioxide battery, and a secondary battery such as a lithium-ion secondary battery. In this embodiment, the battery PS1 is the secondary battery. The battery PS1 is detachably attached to the battery holder PS2 to supply electricity to the assist driving unit DU, the gear changing device GC, and the brake lamp BL. For example, the battery PS1 a replaceable and/or rechargeable battery. The battery holder PS2 is electrically connected to the assist driving unit DU, the gear changing device GC, and the brake lamp BL to supply electricity from the battery PS1 to the assist driving unit DU, the gear changing device GC, and the brake lamp BL. In this embodiment, the power storage PS is mounted to the vehicle body VH1. However, the location of the power storage PS is not limited to this embodiment. The battery holder PS2 can be provided in the vehicle body VH1. The human-powered vehicle VH can include another power supply configured to supply electricity to the assist driving unit DU, the gear changing device GC, and the brake lamp BL instead of or in addition to the power storage PS.

Figure 3:
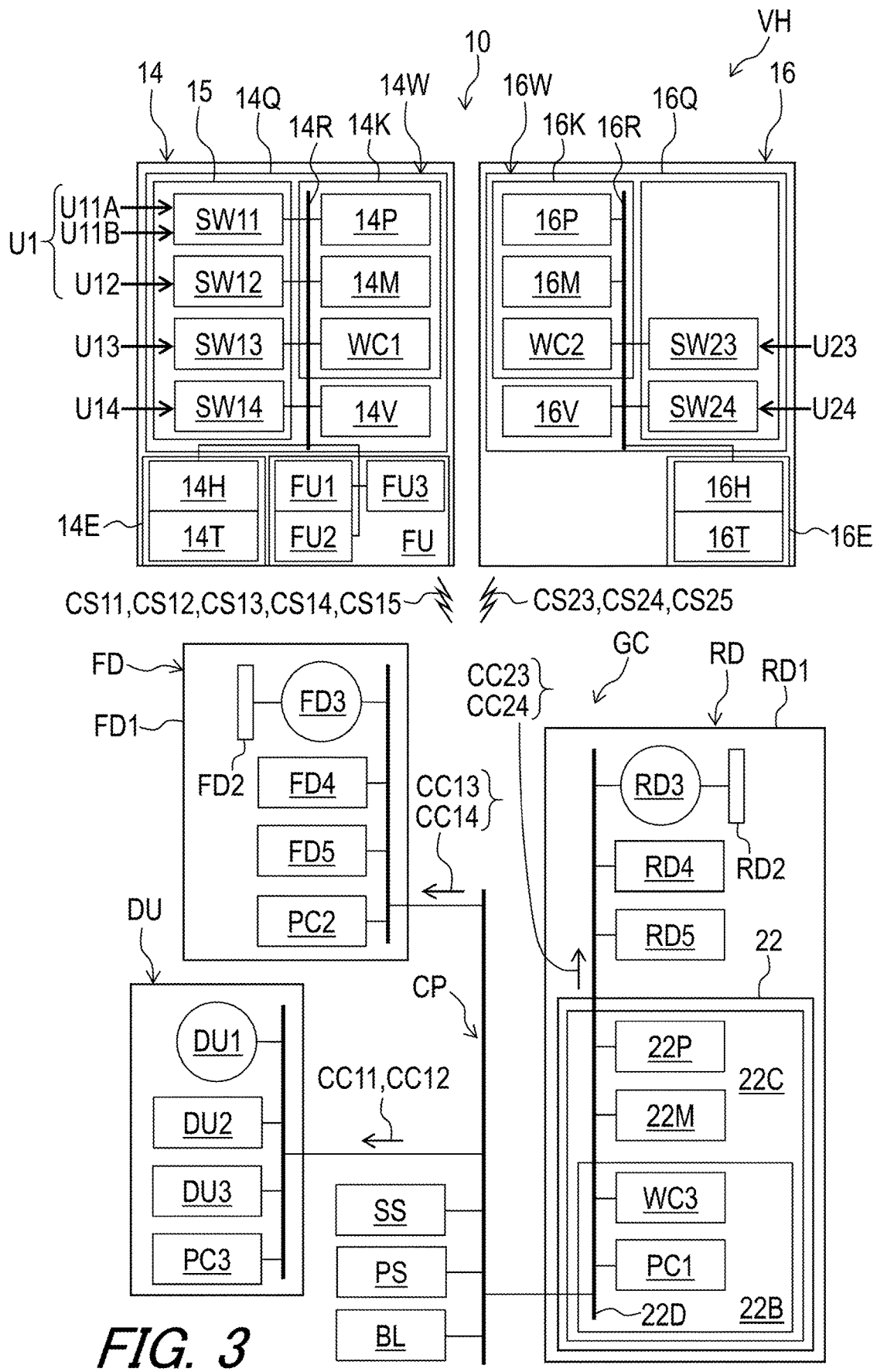
FIG. 3 is a schematic block diagram of the human-powered vehicle illustrated in FIG. 1.

As seen in FIG. 3, the human-powered vehicle VH includes an electric communication path CP. The power storage PS is electrically connected to the assist driving unit DU, the gear changing device GC, and the brake lamp BL with the electric communication path CP to supply electricity to the assist driving unit DU, the gear changing device GC, and the brake lamp BL through the electric communication path CP. For example, the electric communication path CP includes at least one electric cable and/or at least one junction.

Figure 4:
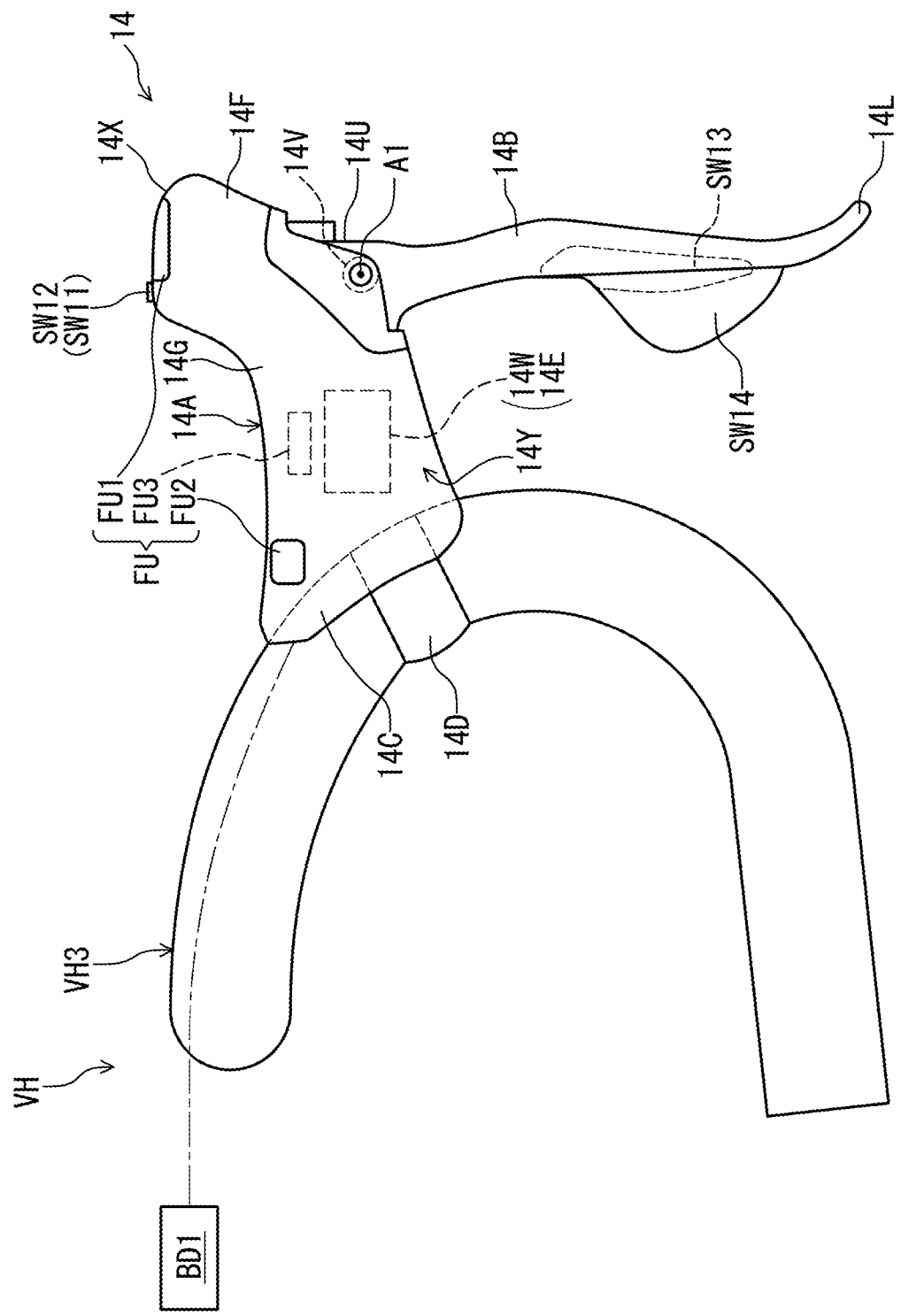
FIG. 4 is a side elevational view the operating device of the human-powered vehicle illustrated in FIG. 1.

As seen in FIG. 4, the operating system 10 comprises an operating device 14. The operating device 14 is configured to operate the first brake device BD1. The operating device 14 for the human-powered vehicle VH comprises a base member 14A and an operating member 14B. The base member 14A is configured to be mounted to the handlebar VH3. The operating member 14B is movably coupled to the base member 14A to control a component different from the assist driving unit DU. In this embodiment, the operating member 14B is pivotally coupled to the base member 14A about a pivot axis A1. The operating device 14 is configured to actuate the first brake device BD1 in response to a movement of the operating member 14B relative to the base member 14A. For example, the operating device 14 includes a brake operating structure 14S configured to operate the brake device BD1 with a movement transmission member such as a wire or a hydraulic fluid. The brake operating structure 14S is configured to be coupled to the brake device BD1 with the movement transmission member.

The base member 14A includes a coupling end 14C, a free end 14F, and a grip portion 14G. The coupling end 14C is configured to be coupled to the handlebar VH3. The operating device 14 comprises a mounting clamp 14D configured to couple the coupling end 14C to the handlebar VH3. The mounting clamp 14D is secured to the coupling end 14C. The free end 14F is opposite to the coupling end 14C. The grip portion 14G is provided between the coupling end 14C and the free end 14F. The grip portion 14G is configured to be gripped by a user. However, the grip portion 14G can be omitted from the base member 14A.

In this embodiment, the operating member 14B includes a lower end 14L and a upper end 14U that is closer to the base member 14A than the lower end 14L. The lower end 14L is positioned below the upper end 14U while the operating device 14 is mounted to the handlebar VH3. However, the structure of the operating member 14B is not limited to this embodiment.

Figure 5:
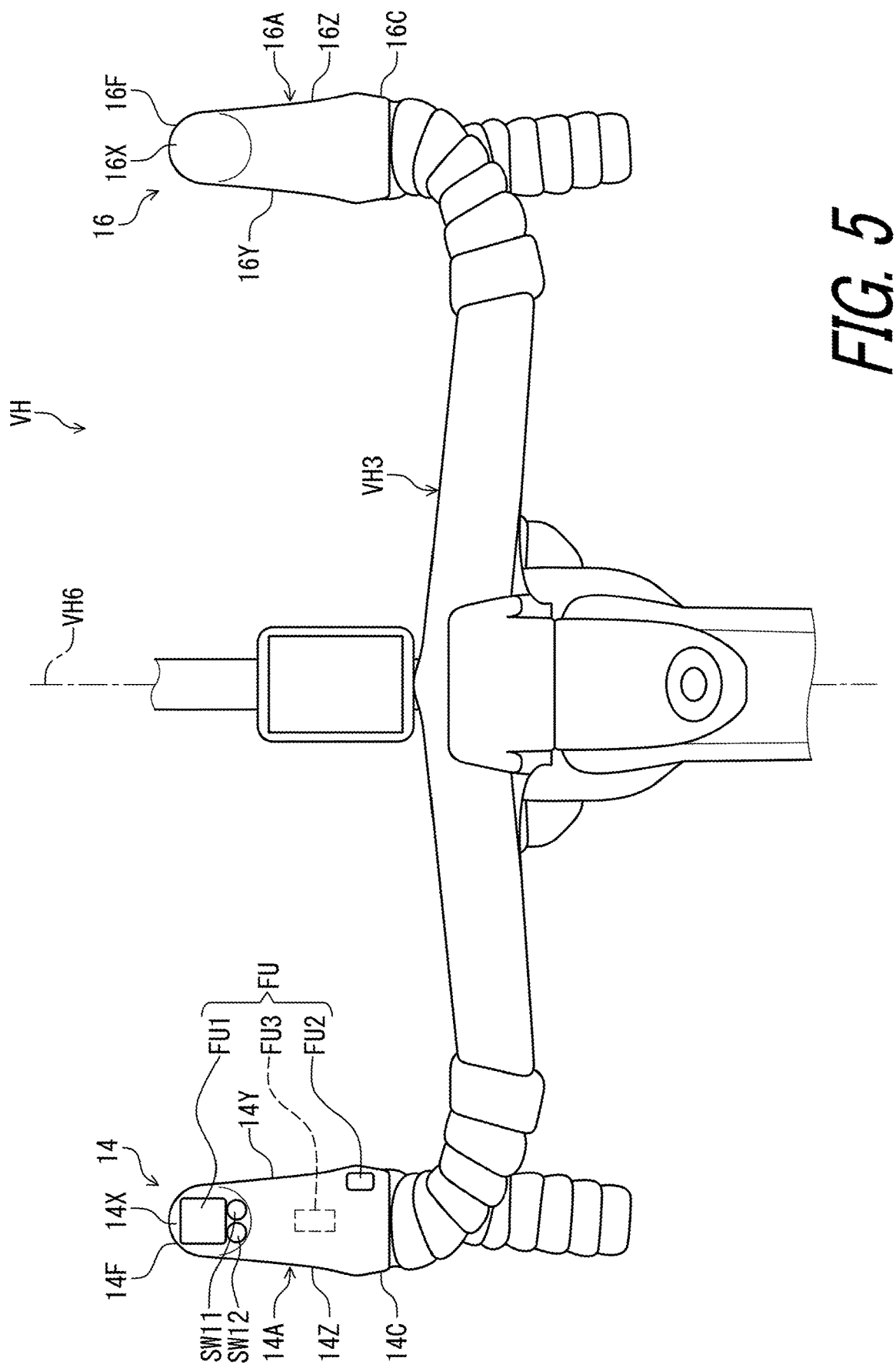
FIG. 5 is a partial plan view of the human-powered vehicle illustrated in FIG. 1.

As seen in FIG. 5, the operating device 14 for the human-powered vehicle VH comprises an informing unit FU. The informing unit FU is configured to inform a user of first information relating to the assist driving unit DU configured to assist a human power. The first information includes at least one of a remaining level of the power storage PS, an ON-OFF state of the assist driving unit DU, and an assist mode of the assist driving unit DU. The informing unit FU is configured to output at least one of the remaining level of the power storage PS, the ON-OFF state of the assist driving unit DU, and the assist mode of the assist driving unit DU.

In this embodiment, the first information includes the remaining level of the power storage PS, the ON-OFF state of the assist driving unit DU, and the assist mode of the assist driving unit DU. The informing unit FU is configured to output the remaining level of the power storage PS, the ON-OFF state of the assist driving unit DU, and the assist mode of the assist driving unit DU. However, at least one of the remaining level of the power storage PS, the ON-OFF state of the assist driving unit DU, and the assist mode of the assist driving unit DU can be omitted from the first information. The informing unit FU can be configured to output (1) the remaining level of the power storage PS alone, (2) the ON-OFF state of the assist driving unit DU alone, (3) the assist mode of the assist driving unit DU, (4) both the remaining level of the power storage PS and the ON-OFF state of the assist driving unit DU, (5) both the ON-OFF state of the assist driving unit DU and the assist mode of the assist driving unit DU, and (6) both the remaining level of the power storage PS and the assist mode of the assist driving unit DU. The informing unit FU can be configured to output information other than the first information instead of or in addition to the first information.

Figure 6:
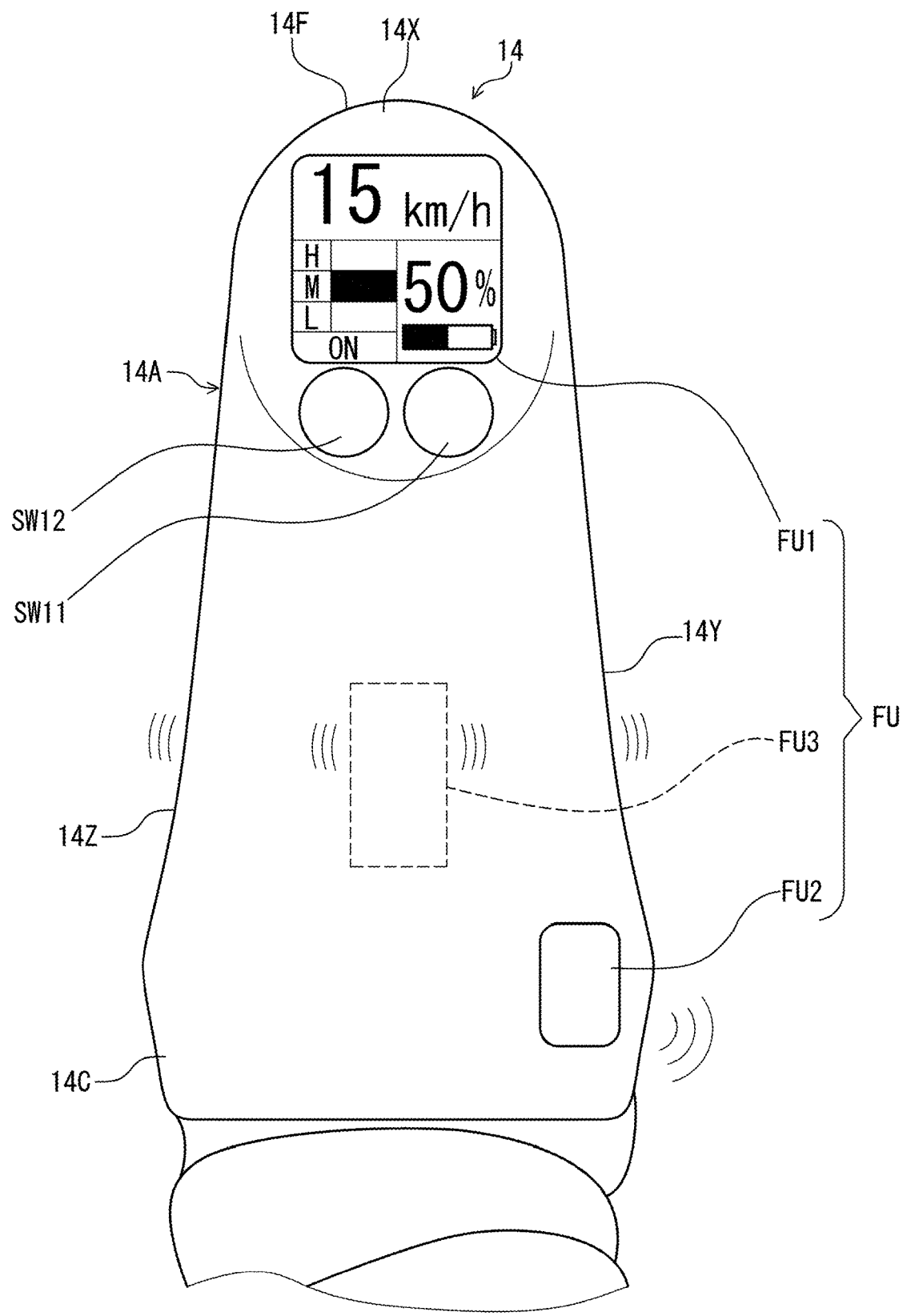
FIG. 6 is an enlarged plan view of the operating device of the human-powered vehicle illustrated in FIG. 1.

As seen in FIG. 6, the informing unit FU is configured to inform the user of the first information at least one of visually, auditory and haptically. In this embodiment, the informing unit FU is configured to inform the user of the first information visually, auditory and haptically. The informing unit FU includes a display unit FU1, a speaker unit FU2, and a vibration unit FU3. However, the informing unit FU can include other structures instead of or in addition to at least one of the display unit FU1, the speaker unit FU2, and the vibration unit FU3.

The display unit FU1 is configured to display the first information. The display unit FU1 is configured to display the remaining level of the power storage PS (e.g., "50%"), the ON-OFF state of the assist driving unit DU (e.g., "ON"), and the assist mode of the assist driving unit DU (e.g., "M").

The speaker unit FU2 is configured to output sound indicating the first information. The speaker unit FU2 is configured to output first sound indicating that the remaining level of the power storage PS is lower than a predetermined level. The speaker unit FU2 is configured to output second sound indicating that the assist driving unit DU is turned on and that the assist driving unit DU is turned off. The speaker unit FU2 is configured to output third sound indicating the assist mode of the assist driving unit DU.

The vibration unit FU3 is configured to generate vibration indicating the first information. The vibration unit FU3 is configured to generate vibration indicating that the remaining level of the power storage PS is lower than the predetermined level.

The informing unit FU is configured to be provided to at least one of the coupling end 14C, the free end 14F, and the grip portion 14G. In this embodiment, the informing unit FU is configured to be provided to the coupling end 14C, the free end 14F, and the grip portion 14G. The display unit FU1 is provided to the free end 14F. The display unit FU1 is provided to the pommel portion 14X. The speaker unit FU2 is provided to the coupling end 14C. The vibration unit FU3 is provided to the grip portion 14G. However, the location of the informing unit FU is not limited to this embodiment. The informing unit FU can be provided to other portions such as the operating member 14B. The display unit FU1 can be provided to the coupling end 14C, the grip portion 14G, and/or other portions such as the operating member 14B. The speaker unit FU2 can be provided to the grip portion 14G, the free end 14F and/or other portions such as the operating member 14B. The vibration unit FU3 can be provided to the coupling end 14C, the free end 14F and/or other portions such as the operating member 14B.

The informing unit FU is configured to output second information different from the first information. In this embodiment, the second information includes a speed of the human-powered vehicle VH. The informing unit FU is configured to output the speed of the human-powered vehicle VH. The display unit FU1 is configured to display the second information. The display unit FU1 is configured to display the speed of the human-powered vehicle VH (e.g., "15 km/h"). However, the informing unit FU can be configured to output information other than the second information. The speaker unit FU2 can be configured to output sound indicating the speed of the human-powered vehicle VH.

As seen in FIG. 3, the operating device 14 further comprises an assist operating switch SW11. The operating device 14 further comprises an additional assist operating switch SW12. The operating device 14 includes an assist user interface 15 configured to receive a user input U1. The assist user interface 15 includes the assist operating switch SW11 and the additional assist operating switch SW12.

The user input U1 includes a user assist operation input U11A and an additional user assist operation input U12 different from the user assist operation input U11A. The assist operating switch SW11 is configured to receive the user assist operation input U11A. The additional assist operating switch SW12 is configured to receive the additional user assist operation input U12. In this embodiment, the user input includes an additional user operation input U11B different from both the user assist operation input U11A and the additional user assist operation input U12. The assist operating switch SW11 is configured to receive the additional user operation input U11B.

The user assist operation input U11A includes a normal press of the assist operating switch SW11. The additional user operation input U11B includes a long press of the assist operating switch SW11. Unlike the user assist operation input U11A, the additional user assist operation input U12 includes a normal press and a long press of the additional assist operating switch SW12. In other words, there is no distinction between the long press and the normal press of the additional assist operating switch SW12. As with the assist operating switch SW11, however, the additional assist operating switch SW12 can be configured to receive the additional user assist operation input U12 with a first manner and another additional user input with a second manner different from the first manner.

In this embodiment, the user assist operation input U11A indicates that the assist driving unit DU increases an assist driving force of the assist driving unit DU. The additional user assist operation input U12 indicates that the assist driving unit DU decreases the assist driving force of the assist driving unit DU.

Figure 7:
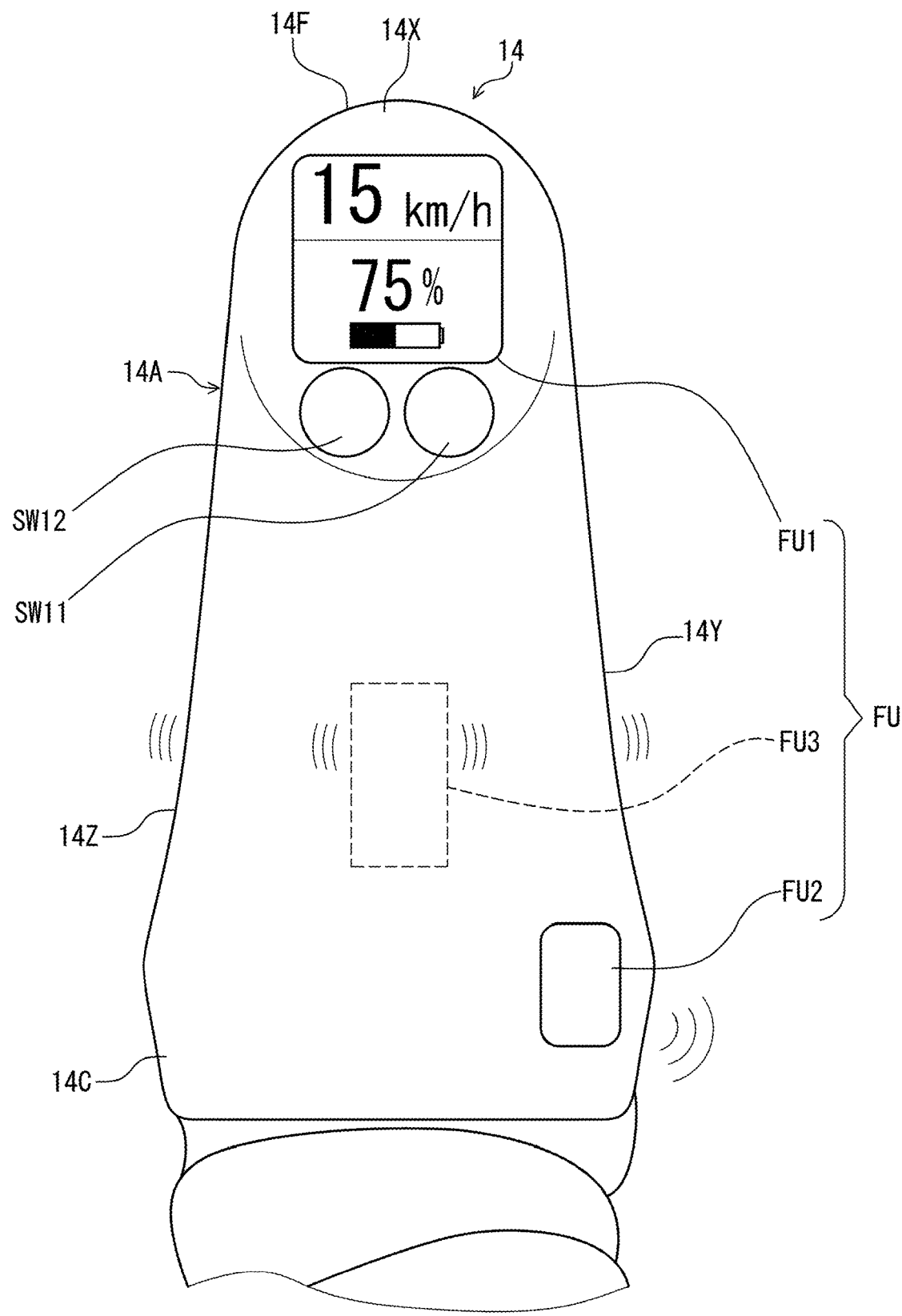
FIG. 7 is an enlarged plan view of the operating device of the human-powered vehicle illustrated in FIG. 1.

The additional user operation input U11B indicates that the informing unit FU (e.g., the display unit FU1) switches information which is output from the informing unit FU. In this embodiment, the additional user operation input U11B indicates that the display unit FU1 switches information displayed on the display unit FU1. For example, as seen in FIG. 7, the controller 14W is configured to control the display unit FU1 to switch display information from the first information to third information relating to the operating device 14 (e.g., a remaining level (e.g., "75%") of an electric power source of the operating device 14) in response to the additional user operation input U11B. The controller 14W is configured to control the display unit FU1 to switch the display information from the third information to the first information (e.g., FIG. 6) in response to the additional user operation input U11B.

The user assist operation input U11A, the additional user assist operation input U12, and the additional user operation input U11B are not limited to this embodiment. At least one of the user assist operation input U11A, the additional user assist operation input U12, and the additional user operation input U11B can be omitted from the operating device 14.

As seen in FIG. 3, the operating device 14 further comprises a first electrical switch SW13 and a second electrical switch SW14. The first electrical switch SW13 is configured to receive a first user operation input U13. The second electrical switch SW14 is configured to receive a second user operation input U14. In this embodiment, the first user operation input U13 indicates upshifting of the gear changing unit FD. The second user operation input U14 indicates downshifting of the gear changing unit FD. However, the first user operation input U13 and the second user operation input U14 are not limited to this embodiment. At least one of the first electrical switch SW13 and the second electrical switch SW14 can be omitted from the operating device 14.

Each of the assist operating switch SW11, the additional assist operating switch SW12, the first electrical switch SW13, and the second electrical switch SW14 includes a normally open switch. Examples of each of the assist operating switch SW11, the additional assist operating switch SW12, the first electrical switch SW13, and the second electrical switch SW14 includes a push-button switch and a lever switch. However, the structure of the operating device 14 is not limited to this embodiment. The operating device 14 can include another structure such as a touch panel instead of or in additional to the assist operating switch SW11, the additional assist operating switch SW12, the first electrical switch SW13, and/or the second electrical switch SW14.

As seen in FIG. 4, the first electrical switch SW13 and the second electrical switch SW14 are mounted to the operating member 14B. However, the locations of the first electrical switch SW13 and the second electrical switch SW14 are not limited to this embodiment. The base member 14A includes a pommel portion 14X provided at the free end 14F. The pommel portion 14X upwardly extends from the grip portion 14G in a state where the operating device 14 is mounted to the handlebar VH3.

As seen in FIG. 5, the base member 14A includes an inner lateral surface 14Y and an outer lateral surface 14Z. The inner lateral surface 14Y is provided between the outer lateral surface 14Z and a center plane VH6 of the human-powered vehicle VH. The assist operating switch SW11 is mounted to at least one of the pommel portion 14X and the inner lateral surface 14Y of the base member 14A. The additional assist operating switch SW12 is mounted to at least one of the pommel portion 14X and the inner lateral surface 14Y of the base member 14A. In this embodiment, each of the assist operating switch SW11 and the additional assist operating switch SW12 is mounted to the pommel portion 14X. However, at least one of the assist operating switch SW11 and the additional assist operating switch SW12 can be mounted to the inner lateral surface 14Y or both the pommel portion 14X and the inner lateral surface 14Y of the base member 14A. The locations of the assist operating switch SW11 and the additional assist operating switch SW12 are not limited to this embodiment.

As seen in FIG. 3, the operating device 14 further comprises a controller 14W. The controller 14W is configured to generate an assist control signal CS11 based on the user assist operation input U11A. The controller 14W is configured to generate an additional assist control signal CS12 based on the additional user assist operation input U12. The controller 14W is configured to generate a first control signal CS13 based on the first user operation input U13. The controller 14W is configured to generate a second control signal CS14 based on the second user operation input U14.

The controller 14W is configured to control the informing unit FU based on the first information. The controller 14W is configured to control the informing unit FU to output the first information. The controller 14W is configured to control the display unit FU1 to display the remaining level of the power storage PS, the ON-OFF state of the assist driving unit DU, and the assist mode of the assist driving unit DU. The controller 14W is configured to control the speaker unit FU2 to output the first sound, the second sound, and the third sound. The controller 14W is configured to control the vibration unit FU3 to generate vibration indicating that the remaining level of the power storage PS is lower than the predetermined level.

The controller 14W is configured to control the informing unit FU based on the second information. The controller 14W is configured to control the informing unit FU to output the second information. The controller 14W is configured to control the display unit FU1 to display the speed of the human-powered vehicle.

As seen in FIG. 3, the controller 14W includes a communicator 14K configured to transmit a control signal. The communicator 14K is configured to be electrically connected to the assist operating switch SW11, the additional assist operating switch SW12, the first electrical switch SW13, and the second electrical switch SW14. The communicator 14K is configured to be electrically connected to the assist operating switch SW11 to generate and transmit an assist control signal CS11 in response to the user assist operation input U11A. The communicator 14K is configured to be electrically connected to the additional assist operating switch SW12 to generate and transmit an additional assist control signal CS12 in response to the additional user assist operation input U12. The communicator 14K is configured to be electrically connected to the first electrical switch SW13 to generate and transmit a first control signal CS13 in response to the first user operation input U13. The communicator 14K is configured to be electrically connected to the second electrical switch SW14 to generate and transmit the second control signal CS14 in response to the second user operation input U14.

As seen in FIG. 4, the operating device 14 includes a movement detector 14V configured to detect that the operating member 14B is operated from a rest position relative to the base member 14A. The movement detector 14V is coupled to the operating member 14B to detect the pivotal movement of the operating member 14B. As seen in FIG. 3, the movement detector 14V is configured to be electrically connected to the communicator 14K. The communicator 14K is configured to transmit a detection signal CS15 if the movement detector 14V detects that the operating member 14B is operated from the rest position relative to the base member 14A.

In this embodiment, the controller 14W includes a wireless communicator WC1 electrically connected to the controller 14W to wirelessly transmit the assist control signal CS11. The wireless communicator WC1 is configured to wirelessly transmit the signals CS11, CS12, CS13, CS14, and CS15. The wireless communicator WC1 is configured to wirelessly receive information. The wireless communicator WC1 is configured to be electrically connected to the assist user interface 15. The wireless communicator WC1 is configured to be electrically connected to the assist operating switch SW11 to generate and wirelessly transmit the assist control signal CS11 in response to the user assist operation input U11A. The wireless communicator WC1 is configured to be electrically connected to the additional assist operating switch SW12 to generate and wirelessly transmit the additional assist control signal CS12 in response to the additional user assist operation input U12. The wireless communicator WC1 is configured to be electrically connected to the first electrical switch SW13 to generate and wirelessly transmit the first control signal CS13 in response to the first user operation input U13. The wireless communicator WC1 is configured to be electrically connected to the second electrical switch SW14 to generate and wirelessly transmit the second control signal CS14 in response to the second user operation input U14. The wireless communicator WC1 is configured to be electrically connected to the movement detector 14V to generate and wirelessly transmit the detection signal CS15 based on the detection result of the movement detector 14V.

The communicator 14K includes a processor 14P, a memory 14M, a circuit board 14Q, and a system bus 14R. The processor 14P and the memory 14M are electrically mounted on the circuit board 14Q. The processor 14P includes a central processing unit (CPU) and a memory controller. The memory 14M is electrically connected to the processor 14P. The memory 14M includes a read only memory (ROM) and a random-access memory (RAM). The memory 14M includes storage areas each having an address in the ROM and the RAM. The processor 14P is configured to control the memory 14M to store data in the storage areas of the memory 14M and reads data from the storage areas of the memory 14M. The circuit board 14Q, the assist operating switch SW11, the additional assist operating switch SW12, the first electrical switch SW13, and the second electrical switch SW14 are electrically connected to the system bus 14R. The assist operating switch SW11, the additional assist operating switch SW12, the first electrical switch SW13, and the second electrical switch SW14 are electrically connected to the processor 14P and the memory 14M with the circuit board 14Q and the system bus 14R. The memory 14M (e.g., the ROM) stores a program. The program is read into the processor 14P, and thereby the configuration and/or algorithm of the communicator 14K is performed.

The wireless communicator WC1 is electrically mounted on the circuit board 14Q. The wireless communicator WC1 is electrically connected to the processor 14P and the memory 14M with the circuit board 14Q and the system bus 14R. The wireless communicator WC1 includes a signal transmitting circuit, a signal receiving circuit, and an antenna. Thus, the wireless communicator WC1 can also be referred to as a wireless communication circuit WC1.

The wireless communicator WC1 is configured to superimpose a digital signal such as the signal CS11, CS12, CS13, CS14, or CS15 on carrier wave using a predetermined wireless communication protocol to wirelessly transmit the digital signal. In this embodiment, the wireless communicator WC1 is configured to encrypt a signal such as the signal CS11, CS12, CS13, CS14, or CS15 using a cryptographic key to generate encrypted wireless signals.

The wireless communicator WC1 is configured to receives a wireless signal via the antenna. In this embodiment, the wireless communicator WC1 is configured to decode the wireless signal to recognize signals and/or information wirelessly transmitted from another wireless communicator. The wireless communicator WC1 is configured to decrypt the wireless signal using the cryptographic key.

The operating device 14 includes an electric power source 14E. The electric power source 14E is configured to supply electricity to the communicator 14K. The electric power source 14E is configured to be electrically connected to the communicator 14K. In this embodiment, the electric power source 14E includes a battery 14T and a battery holder 14H. The battery 14T includes a replaceable and/or rechargeable battery. The battery holder 14H is configured to be electrically connected to the communicator 14K via the circuit board 14Q and the system bus 14R. The battery 14T is configured to be detachably attached to the battery holder 14H. However, the electric power source 14E is not limited to this embodiment. For example, the electric power source 14E can include another component such as a capacitor and an electricity generation element (e.g., a piezoelectric element) instead of or in addition to the battery 14T and the battery holder 14H.

Figure 8:
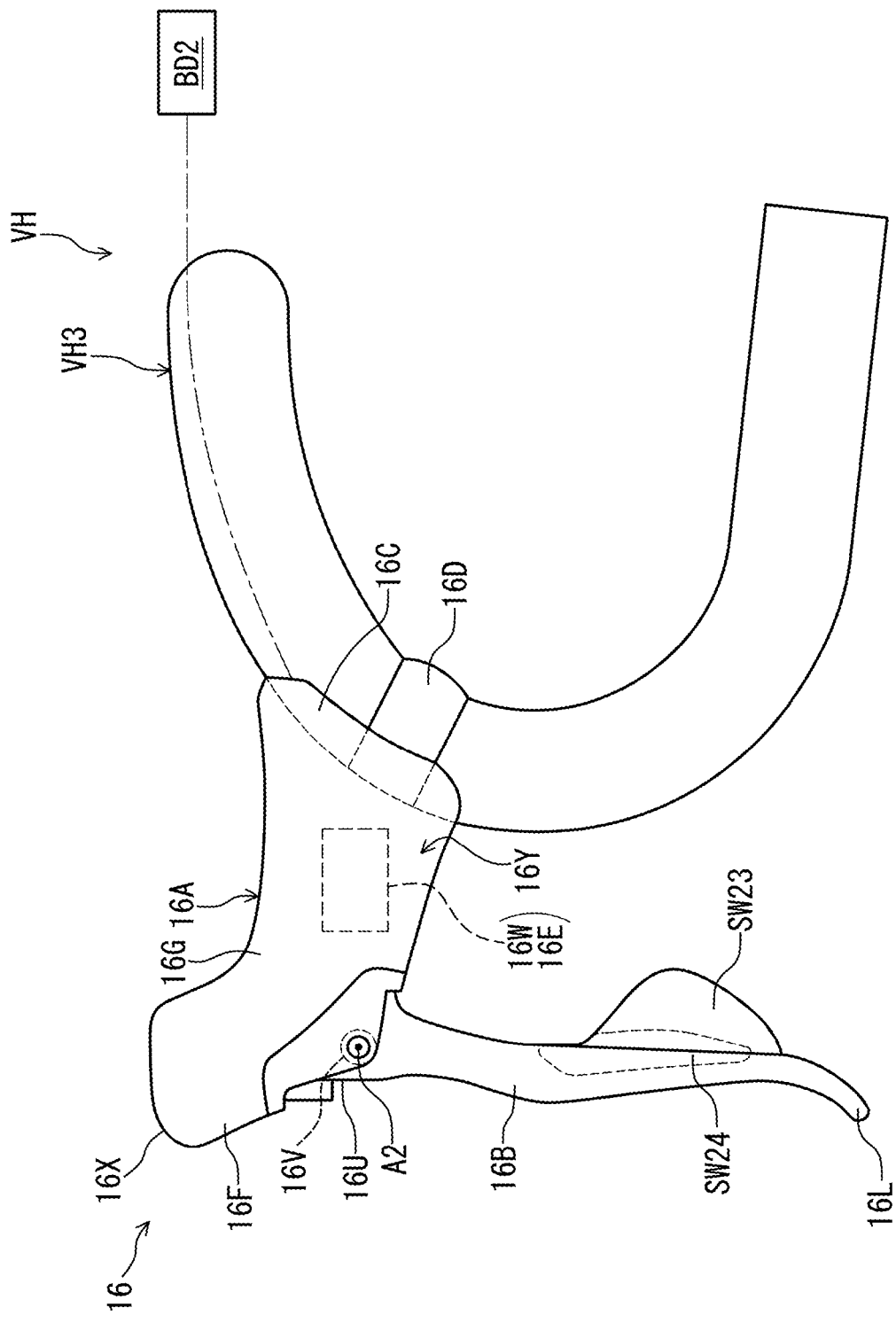
FIG. 8 is a side elevational view another operating device of the human-powered vehicle illustrated in FIG. 1.

As seen in FIGS. 3 and 8, the operating system 10 comprises an operating device 16. The operating device 16 is configured to operate the second brake device BD2. The operating device 16 has substantially the same structure as the structure of the operating device 14 except that the operating device 16 has a symmetrical shape with the operating device 14 with respect to the center plane VH6 (see FIG. 5). The description of the operating device 14 can be utilized as the description of the operating device 16 by replacing "14," "A1," "FD," "WC1," "SW13," "SW14," "U13," "U14," "C S13," "CS14," and "CS15" of the description with "16," "A2," "RD," "WC2," "SW23," "SW24," "U23," "U24," "CS23," "CS24," and "CS25." Thus, they will not be described in detail here for the sake of brevity. Electrical switches corresponding to the assist operating switch SW11 and the additional assist operating switch SW12 are omitted from the operating device 16. The informing unit FU is omitted from the operating device 16. However, the operating device 16 can include such electrical switches and/or informing unit.

As seen in FIG. 3, the operating system 10 further comprises an actuation controller 22. The actuation controller 22 is configured to be communicate with the operating device 14 and the operating device 16. In this embodiment, the actuation controller 22 is configured to be mounted to the gear changing device GC. More specifically, the actuation controller 22 is configured to be mounted to the gear changing unit RD. However, the actuation controller 22 can be mounted to another device such as the operating device 14, the operating device 16, the gear changing unit FD, the assist driving unit DU, and the power storage PS.

The actuation controller 22 includes a processor 22P, a memory 22M, a circuit board 22C, and a system bus 22D. The processor 22P and the memory 22M are electrically mounted on the circuit board 22C. The processor 22P includes a CPU and a memory controller. The memory 22M is electrically connected to the processor 22P. The memory 22M includes a ROM and a RAM. The memory 22M includes storage areas each having an address in the ROM and the RAM. The processor 22P is configured to control the memory 22M to store data in the storage areas of the memory 22M and reads data from the storage areas of the memory 22M. The memory 22M (e.g., the ROM) stores a program. The program is read into the processor 22P, and thereby the configuration and/or algorithm of the communicator 22B is performed.

The actuation controller 22 includes a communicator 22B. The communicator 22B is configured to communicate with the communicators 14K and 16K.

In this embodiment, the actuation controller 22 is configured to receive the assist control signal CS11, the additional assist control signal CS12, the first control signal CS13, the second control signal CS14, and the detection signal CS15 from the operating device 14. The actuation controller 22 is configured to receive the first control signal CS23, the second control signal CS24, and the detection signal CS25 from the operating device 16.

In this embodiment, the communicator 22B includes a wireless communicator WC3 configured to wirelessly receive signals or other information from the wireless communicators WC1 and WC2. The wireless communicator WC3 is configured to wirelessly transmit signals or other information to the wireless communicators WC1 and WC2.

The wireless communicator WC3 is electrically mounted on the circuit board 22C. The wireless communicator WC3 is electrically connected to the processor 22P and the memory 22M with the circuit board 22C and the system bus 22D. The wireless communicator WC3 includes a signal transmitting circuit, a signal receiving circuit, and an antenna. Thus, the wireless communicator WC3 can also be referred to as a wireless communication circuit WC3.

The wireless communicator WC3 is configured to superimpose a digital signal on carrier wave using a predetermined wireless communication protocol to wirelessly transmit the digital signal. In this embodiment, the wireless communicator WC3 is configured to encrypt a signal using a cryptographic key to generate encrypted wireless signals.

The wireless communicator WC3 is configured to receive a wireless signal via the antenna. In this embodiment, the wireless communicator WC3 is configured to decode the wireless signal to recognize each of the signals CS11 to CS15 and CS23 to CS25 which are wirelessly transmitted from the wireless communicator WC1 and the wireless communicator WC2. The wireless communicator WC3 is configured to decrypt the wireless signal using the cryptographic key.

The actuation controller 22 is configured to generate an assist control command CC11 based on the assist control signal CS11. The actuation controller 22 is configured to generate an additional assist control command CC12 based on the additional assist control signal CS12. The actuation controller 22 is configured to generate a first control command CC13 based on the first control signal CS13. The actuation controller 22 is configured to generate a second control command CC14 based on the second control signal CS14. Thus, the actuation controller 22 is configured to generate the assist control command CC11 based on the user assist operation input U11A. The actuation controller 22 is configured to generate the additional assist control command CC12 based on the additional user assist operation input U12. The actuation controller 22 is configured to generate the first control command CC13 based on the first user operation input U13. The actuation controller 22 is configured to generate the second control command CC14 based on the second user operation input U14.

The actuation controller 22 is configured to generate a first control command CC23 based on the first control signal CS23. The actuation controller 22 is configured to generate a second control command CC24 based on the second control signal CS24. Thus, the actuation controller 22 is configured to generate the first control command CC23 based on the first user operation input U23. The actuation controller 22 is configured to generate the second control command CC24 based on the second user operation input U24.

The actuation controller 22 is configured to control the assist driving unit DU to change the assist driving force based on each of the user assist operation input U11A and the additional user assist operation input U12. The actuation controller 22 is configured to control the assist driving unit DU to increase the assist driving force based on the user assist operation input U11A. The actuation controller 22 is configured to control the assist driving unit DU to decrease the assist driving force based on the additional user assist operation input U12.

More specifically, the actuation controller 22 is configured to control the assist driving unit DU to increase the assist driving force based on the assist control signal CS11. The actuation controller 22 is configured to control the assist driving unit DU to decrease the assist driving force based on the additional assist control signal CS12.

Furthermore, the actuation controller 22 is configured to control the gear changing device GC to change the gear ratio of the gear changing device GC based on the first user operation input U13. The actuation controller 22 is configured to control the gear changing device GC to change the gear ratio of the gear changing device GC based on the second user operation input U14. The actuation controller 22 is configured to control the gear changing device GC to change the gear ratio of the gear changing device GC based on the first user operation input U23. The actuation controller 22 is configured to control the gear changing device GC to change the gear ratio of the gear changing device GC based on the second user operation input U24.

In this embodiment, the actuation controller 22 is configured to control the gear changing unit FD to increase the gear ratio of the gear changing device GC based on the first user operation input U13. The actuation controller 22 is configured to control the gear changing unit FD to decrease the gear ratio of the gear changing device GC based on the second user operation input U14. The actuation controller 22 is configured to control the gear changing unit RD to increase the gear ratio of the gear changing device GC based on the first user operation input U23. The actuation controller 22 is configured to control the gear changing unit RD to decrease the gear ratio of the gear changing device GC based on the second user operation input U24.

More specifically, the actuation controller 22 is configured to control the gear changing unit FD to increase the gear ratio of the gear changing device GC based on the first control signal CS13. The actuation controller 22 is configured to control the gear changing unit FD to decrease the gear ratio of the gear changing device GC based on the second control signal CS14. The actuation controller 22 is configured to control the gear changing unit RD to increase the gear ratio of the gear changing device GC based on the first control signal CS23. The actuation controller 22 is configured to control the gear changing unit RD to decrease the gear ratio of the gear changing device GC based on the second control signal CS24.

As seen in FIG. 3, the motor controller DU3 is configured to control the assist motor DU1 to increase the assist driving force of the assist motor DU1 based on the assist control command CC11. The motor controller DU3 is configured to control the assist motor DU1 to decrease the assist driving force of the assist motor DU1 based on the additional assist control command CC12.

The motor controller DU3 includes a processor, a memory, a circuit board, and a system bus. The motor controller DU3 has substantially the same structure as the structure of the actuation controller 22. Thus, it will not be described in detail here for the sake of brevity.

The assist driving unit DU has a plurality of assist modes. Each assist mode has an assist ratio. The motor controller DU3 is configured to store a plurality of assist modes and a plurality of assist ratios. For example, the plurality of assist ratios includes a first assist ratio, a second assist ratio, and a third assist ratio. The first assist ratio is lower than the second assist ratio. The third assist ratio is higher than the second assist ratio. The motor controller DU3 is configured to calculate an assist driving force based on the selected assist ratio and the pedaling force sensed by the pedaling-force sensor DU2. The motor controller DU3 is configured to control the assist motor DU1 to apply the calculated assist driving force to the drive train VH5.

The motor controller DU3 is configured to select one of the first to third assist ratios based on the control commands CC11 and CC12. The motor controller DU3 is configured to select an assist ratio higher than the current assist ratio by one step in response to the assist control command CC11. The motor controller DU3 is configured to select an assist ratio lower than the current assist ratio by one step in response to the additional assist control command CC12. For example, the motor controller DU3 is configured to select the second assist ratio in response to the assist control command CC11 when the current assist ratio is the first assist ratio. The motor controller DU3 is configured to select the third assist ratio in response to the assist control command CC11 when the current assist ratio is the second assist ratio. The motor controller DU3 is configured to select the second assist ratio in response to the additional assist control command CC12 when the current assist ratio is the third assist ratio. The motor controller DU3 is configured to select the first assist ratio in response to the additional assist control command CC12 when the current assist ratio is the second assist ratio. The motor controller DU3 is configured to store the selected assist ratio and the assist mode corresponding to the selected assist ratio.

As seen in FIG. 3, the gear changing unit RD includes a base member RD1, a chain guide RD2, an actuator RD3, a position sensor RD4, and an actuator driver RD5. The base member RD1 is mounted to the vehicle body VH1 (see e.g., FIG. 1). The chain guide RD2 is configured to guide the chain C. The chain guide RD2 is movably coupled to the base member RD1 and is configured to engage with the chain C when shifting the chain C relative to the rear sprocket assembly RS. The actuator RD3 is configured to move the chain guide RD2 relative to the base member RD1 to shift the chain C relative to the rear sprocket assembly RS. Examples of the actuator RD3 include a direct current motor and a stepper motor.

The actuator driver RD5 is electrically connected to the actuator RD3 to control the actuator RD3 based on the first control command CC23 and the second control command CC24 generated by the actuation controller 22. Examples of the actuator RD3 include a direct-current (DC) motor and a stepper motor. The actuator RD3 includes a rotational shaft operatively coupled to the chain guide RD2. The position sensor RD4 is configured to sense a current gear position of the gear changing unit RD. Examples of the position sensor RD4 include a potentiometer and a rotary encoder. The position sensor RD4 is configured to sense an absolute rotational position of the rotational shaft of the actuator RD3 as the current gear position of the gear changing unit RD. The actuator RD3 and the position sensor RD4 are electrically connected to the actuator driver RD5.

The actuator driver RD5 is configured to control the actuator RD3 to move the chain guide RD2 relative to the base member RD1 by one gear position in a downshift direction based on the first control command CC23 and the current gear position sensed by the position sensor RD4. The actuator driver RD5 is configured to control the actuator RD3 to move the chain guide RD2 relative to the base member RD1 by one gear position in an upshift direction based on the second control command CC24 and the current gear position sensed by the position sensor RD4.

As seen in FIG. 3, the gear changing unit FD includes a base member FD1, a chain guide FD2, an actuator FD3, a position sensor FD4, and an actuator driver FD5. The base member FD1 is mounted to the vehicle body VH1 (see e.g., FIG. 1). The chain guide FD2 is configured to guide the chain C. The chain guide FD2 is movably coupled to the base member FD1 and is configured to contact the chain C when shifting the chain C relative to the front sprocket assembly FS. The actuator FD3 is configured to move the chain guide FD2 relative to the base member FD1 to shift the chain C relative to the front sprocket assembly FS. Examples of the actuator FD3 include a direct current motor and a stepper motor.

The actuator driver FD5 is electrically connected to the actuator FD3 to control the actuator FD3 based on the first control command CC13 and the second control command CC14 generated by the actuation controller 22. Examples of the actuator FD3 include a direct-current (DC) motor and a stepper motor. The actuator FD3 includes a rotational shaft operatively coupled to the chain guide FD2. The position sensor FD4 is configured to sense a current gear position of the gear changing unit FD. Examples of the position sensor FD4 include a potentiometer and a rotary encoder. The position sensor FD4 is configured to sense an absolute rotational position of the rotational shaft of the actuator FD3 as the current gear position of the gear changing unit FD. The actuator FD3 and the position sensor FD4 are electrically connected to the actuator driver FD5.

The actuator driver FD5 is configured to control the actuator FD3 to move the chain guide FD2 relative to the base member FD1 by one gear position in a downshift direction based on the first control command CC13 and the current gear position sensed by the position sensor FD4. The actuator driver FD5 is configured to control the actuator FD3 to move the chain guide FD2 relative to the base member FD1 by one gear position in an upshift direction based on the second control command CC14 and the current gear position sensed by the position sensor FD4.

As seen in FIG. 2, the actuation controller 22, the assist driving unit DU, the gear changing unit FD, and the gear changing unit RD communicate with each other via the electric communication path CP using power line communication (PLC) technology. More specifically, each of the electric cables of the electric communication path CP includes a ground line and a voltage line that are detachably connected to a serial bus that is formed by communication interfaces and the junction. In this embodiment, the actuation controller 22, the gear changing unit RD, the gear changing unit FD, and the assist driving unit DU can all communicate with each other through the voltage line using the PLC technology.

As seen in FIG. 3, the control commands CC13 and CC14 are transmitted from the actuation controller 22 to the gear changing unit FD through the electric communication path CP. The control commands CC11 and CC12 are transmitted from the actuation controller 22 to the assist driving unit DU through the electric communication path CP. However, the gear changing unit FD can include a wireless communicator configured to wirelessly receive the first control signal CS13 and the second control signal CS14 from the operating system 10. The assist driving unit DU can include a wireless communicator configured to wirelessly receive the control commands CC11 and CC12 from the operating system 10. In such embodiment, the electric communication path CP can be omitted from the human-powered vehicle VH. The assist driving unit DU can use the power storage PS, and each of the gear changing unit FD and the gear changing unit RD can include another power supply.

The PLC technology is used for communicating between electric components. The PLC carries data on a conductor that is also used simultaneously for electric power transmission or electric power distribution to the electric components. In this embodiment, electricity is supplied from the power storage PS to the gear changing unit FD, the gear changing unit RD, and the assist driving unit DU via the electric communication path CP. Furthermore, the actuation controller 22 can receive information signals from the gear changing unit RD, the gear changing unit FD, the assist driving unit DU, and the power storage PS through the electric communication path CP using the PLC.

The PLC uses unique identifying information such as a unique identifier that is assigned to each of the assist driving unit DU, the gear changing unit FD, the gear changing unit RD, and the power storage PS. Each of the electric components DU, FD, RD, and PS includes a memory in which the unique identifying information is stored. Based on the unique identifying information, each of the electric components DU, FD, RD, and PS is configured to recognize, based on the unique identifying information, information signals which are necessary for itself among information signals transmitted via the electric communication path CP. For example, the actuation controller 22 is configured to recognize information signals transmitted from the assist driving unit DU, the gear changing unit FD, the gear changing unit RD, and the power storage PS with the electric communication path CP. Instead of using the PLC technology, however, separate signal wires can be provided for transmitting data in addition to the ground wire and the voltage wire if needed and/or desired.

The communicator 22B includes a PLC controller PC1. The PLC controller PC1 is connected to the electric communication path CP, the gear changing unit RD, and the system bus 22D. The PLC controller PC1 is configured to separate input signals to a power source voltage and control signals. The PLC controller PC1 is configured to regulate the power source voltage to a level at which the actuation controller 22 and the gear changing unit RD can properly operate. The PLC controller PC1 is further configured to superimpose output signals such as the control commands CC11, CC12, CC13, CC14, CC23, and CC24 on the power source voltage applied to the electric communication path CP from the power storage PS. The memory 22M is configured to store the unique identifying information of the actuation controller 22, the gear changing unit FD, and the assist driving unit DU.

The gear changing unit FD includes a PLC controller PC2. The assist driving unit DU includes a PLC controller PC3. The PLC controllers PC2 and PC3 have substantially the same structure as the structure of the PLC controller PC1. Thus, they will not be described in detail for the sake of brevity.

The actuation controller 22 is configured to obtain the first information from the assist driving unit DU and the power storage PS through the electric communication path CP. The actuation controller 22 is configured to transmit the first information to the controller 14W of the operating device 14. Thus, the controller 14W is configured to receive the first information from the assist driving unit. The controller 14W is configured to receive the first information from the assist driving unit and the power storage PS.

In this embodiment, the actuation controller 22 is configured to obtain the remaining level of the power storage PS from the power storage PS through the electric communication path CP. The actuation controller 22 is configured to obtain the ON-OFF state of the assist driving unit and the assist mode of the assist driving unit from the assist driving unit DU through the electric communication path CP. The actuation controller 22 is configured to transmit the remaining level of the power storage, the ON-OFF state of the assist driving unit, and the assist mode of the assist driving unit to the controller 14W through the wireless communicators WC1 and WC3. The controller 14W is configured to receive the remaining level of the power storage, the ON-OFF state of the assist driving unit, and the assist mode of the assist driving unit from the actuation controller 22.

The actuation controller 22 is configured to obtain the second information from the speed sensor SS through the electric communication path CP. The actuation controller 22 is configured to transmit the second information to the controller 14W of the operating device 14. Thus, the controller 14W is configured to receive the second information from the speed sensor. The controller 14W is configured to receive the second information from the assist driving unit and the power storage PS. In this embodiment, the actuation controller 22 is configured to obtain the rotational speed of the second wheel W2 from the speed sensor SS through the electric communication path CP. The actuation controller 22 is configured to calculate the speed of the human-powered vehicle VH based on the rotational speed of the second wheel W2. The actuation controller 22 is configured to transmit the speed of the human-powered vehicle VH to the controller 14W through the wireless communicators WC1 and WC3.

The actuation controller 22 is configured to control the brake lamp BL. The actuation controller 22 is configured to turn the brake lamp BL on while the actuation controller 22 receives the detection signal CS15 and/or the detection signal CS25. The actuation controller 22 is configured to turn the brake lamp BL off while the actuation controller 22 does not receive both the detection signal CS15 and the detection signal CS25.

Second Embodiment

An operating system 210 including an operating device 214 in accordance with a second embodiment will be described below referring to FIG. 9. The operating system 210 has the same structure and/or configuration as those of the operating system 10 except for the wireless communicators WC1 and WC2. Thus, elements having substantially the same function as those in the first embodiment will be numbered the same here and will not be described and/or illustrated again in detail here for the sake of brevity.

Figure 9:
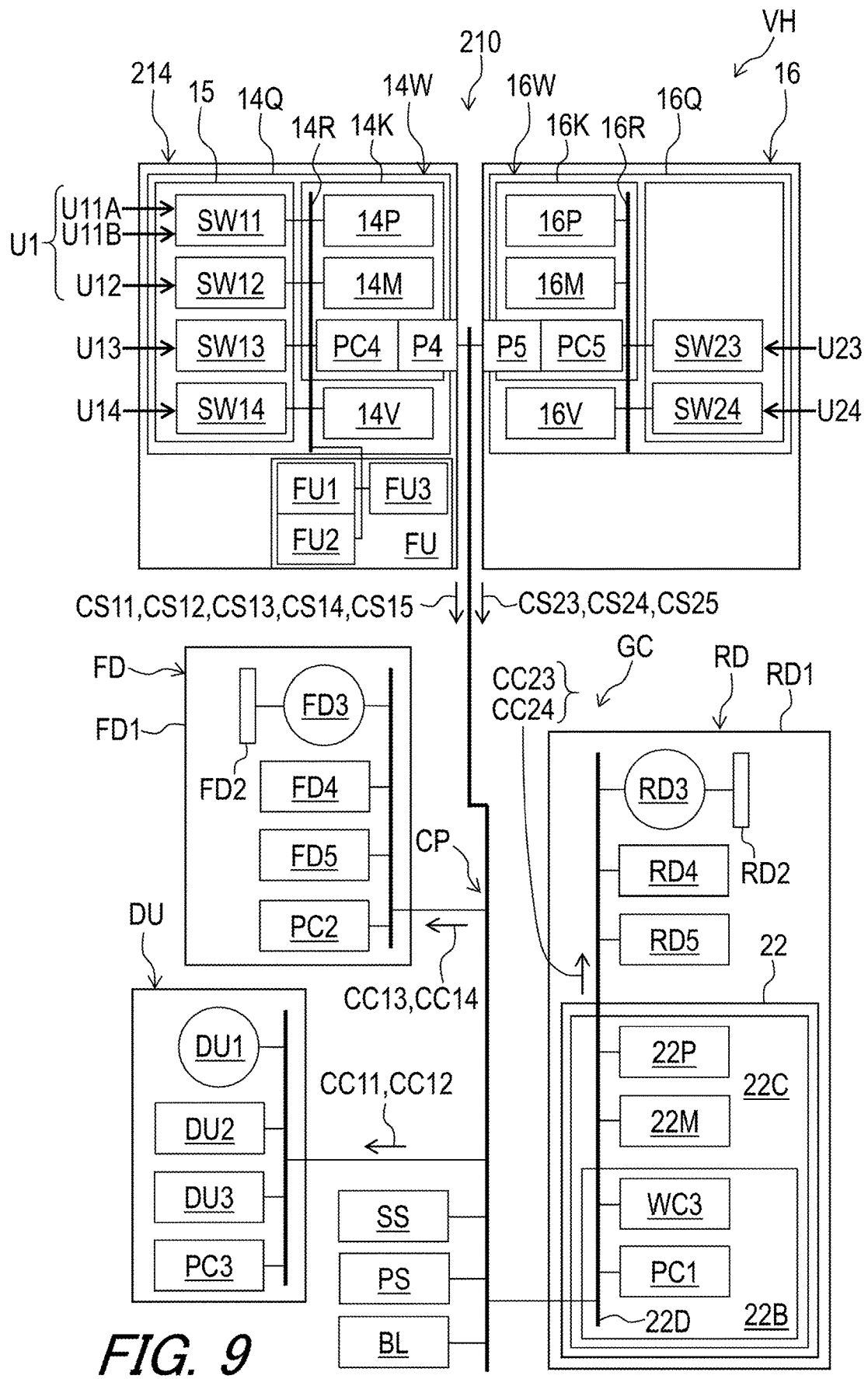
FIG. 9 is a schematic block diagram of the human-powered vehicle including an operating device in accordance with a second embodiment.

As seen in FIG. 9, the operating system 210 comprises the operating device 214 and an operating device 216. The operating device 214 has substantially the same structure as the structure of the operating device 14 of the first embodiment. The operating device 216 has substantially the same structure as the structure of the operating device 16 of the first embodiment. The operating device 214 for the human-powered vehicle VH comprises the informing unit FU. The informing unit FU is configured to inform a user of the first information relating to the assist driving unit DU configured to assist the human power.

In this embodiment, the wireless communicator WC1 is omitted from the operating device 214. Instead, the operating device 214 further comprises a communication port P4. The communication port P4 is configured to be connected to an electric cable. The communication port P4 is electrically connected to the controller 14W to transmit the assist control signal CS11 via the communication port P4. The communication port P4 is electrically connected to the actuation controller 22 through the communication port P4 and the electric communication path CP.

As with the operating device 214, the wireless communicator WC2 is omitted from the operating device 216. The operating device 216 further comprises a communication port P5. The communication port P5 is configured to be connected to an electric cable. The communication port P5 is electrically connected to the controller 14W to transmit the assist control signal CS11 via the communication port P5. The communication port P5 is electrically connected to the actuation controller 22 through the communication port P5 and the electric communication path CP.

The power storage PS supplies electricity to the operating devices 14 and 16 through the electric communication path CP. Thus, the electric power sources 14E and 16E can be respectively omitted from the operating devices 14 and 16.

The human-powered vehicle VH includes an actuation controller 222. The actuation controller 222 has substantially the same structure as the structure of the actuation controller 22 of the first embodiment. In this embodiment, the wireless communicator WC3 is omitted from the actuation controller 222.

The operating device 214 includes a PLC controller PC4 electrically connected to the communication port P4, The operating device 216 includes a PLC controller PC5 electrically connected to the communication port P5. The PLC controllers PC4 and PC5 have substantially the same structure as the structure of the PLC controller PC1. Thus, they will not be described in detail for the sake of brevity.

Modifications

In the above embodiments and the modifications, as seen in FIGS. 5 and 6, the base member 14A includes the grip portion 14G, and the base member 16A includes the grip portion 16G. However, the grip portion 14G can be omitted from the base member 14A. The grip portion 16G can be omitted from the base member 16A.

In the above embodiments and the above modifications, as seen in FIG. 5, the operating device 14 is provided on the left side with respect to the center plane VH6 of the human-powered vehicle VH. The operating device 16 is provided on the right side with respect to the center plane VH6 of the human-powered vehicle VH. However, the operating device 14 can be provided on the right side with respect to the center plane VH6 of the human-powered vehicle VH. The operating device 16 can be provided on the left side with respect to the center plane VH6 of the human-powered vehicle VH. The operating device 14 and the operating device 16 can be provided on the same side with respect to the center plane VH6 of the human-powered vehicle VH.

In the above embodiments and the above modifications, the informing unit FU is provided to the operating device 14. However, the informing unit FU can be provided to the operating device 16 instead of or in addition to the operating device 14.

In the above embodiments and the above modifications, the informing unit FU includes the display unit FU1, the speaker unit FU2, and the vibration unit FU3. However, at least one of the display unit FU1, the speaker unit FU2, and the vibration unit FU3 can be omitted from the informing unit FU. The informing unit FU can include other structures other than the display unit FU1, the speaker unit FU2, and the vibration unit FU3.

In the above embodiments and the above modifications, the informing unit FU is integrally provided to the base member 14A of the operating device 14 or 214. However, the informing unit FU can be a separate unit from the base member 14A which is detachably attached to the base member 14A.

Figure 10:
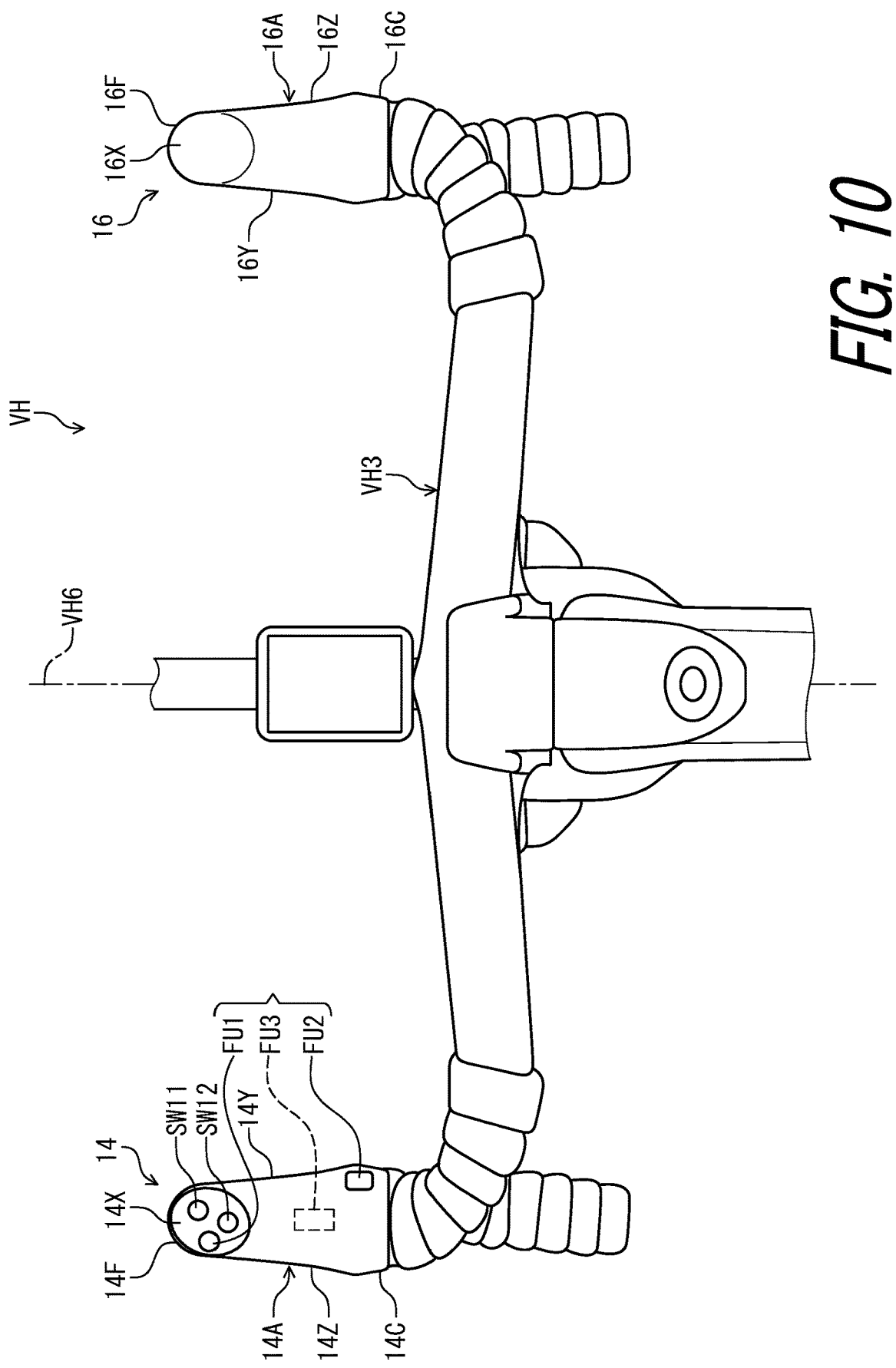
FIG. 10 is a partial plan view of the human-powered vehicle including an operating device in accordance with a modification.

As seen in FIG. 10, the display unit FU1 can include a multicolor light emitting element such as a light emitting diode (LED). In such modification, the display unit FU1 can be configured to emit first light, second light, and third light. The first light has a first color. The second light has a second color different from the first color. The third light has a third color different from the first color and the second color. The display unit FU1 is configured to indicate, with the first light, one of the remaining level of the power storage PS, the ON-OFF state of the assist driving unit DU, and the assist mode of the assist driving unit DU. The display unit FU1 is configured to indicate, with the second light, another of the remaining level of the power storage PS, the ON-OFF state of the assist driving unit DU, and the assist mode of the assist driving unit DU. The display unit FU1 is configured to indicate, with the third light, the other of the remaining level of the power storage PS, the ON-OFF state of the assist driving unit DU, and the assist mode of the assist driving unit DU.

The term "comprising" and its derivatives, as used herein, are intended to be open ended twins that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device for a human-powered vehicle, comprising:
    a base member configured to be mounted to a handlebar;
    an informing unit configured to inform a user of first information relating to an assist driving unit configured to assist a human power; and
    an operating member movably coupled to the base member to control a component different from the assist driving unit, wherein
    the base member includes
        a coupling end configured to be coupled to the handlebar, and
        a free end opposite to the coupling end,
    the informing unit includes a display unit provided on the free end of the base member, and the display unit is configured to display the first information, wherein the first information includes at least one of a remaining level of a power storage of the assist driving unit, an ON-OFF state of the assist driving unit, and an assist mode of the assist driving unit.

2. The operating device according to claim 1, wherein
the informing unit is configured to output at least one of the remaining level of the power storage of the assist driving unit, the ON-OFF state of the assist driving unit, and the assist mode of the assist driving unit.

3. The operating device according to claim 2, wherein
the informing unit is configured to output second information different from the first information.

4. The operating device according to claim 3, wherein
the second information includes a speed of the human-powered vehicle, and
the informing unit is configured to output the speed of the human-powered vehicle.

5. The operating device according to claim 1, wherein
the informing unit is configured to inform the user of the first information at least one of visually, auditory and haptically.

6. The operating device according to claim 1, wherein
the base member further includes a grip portion provided between the coupling end and the free end.

7. The operating device according to claim 6, wherein
the informing unit further includes a speaker unit and a vibration unit that are each provided to at least one of the coupling end, the free end, and the grip portion.

8. The operating device according to claim 1, further comprising:
an assist operating switch configured to receive a user assist operation input; and
a controller configured to generate an assist control signal based on the user assist operation input.

9. The operating device according to claim 8, wherein
the controller is configured to control the informing unit based on the first information.

10. The operating device according to claim 8, wherein
the controller is configured to receive the first information from the assist driving unit.

11. The operating device according to claim 8, further comprising
a communication port configured to be connected to an electric cable, wherein
the communication port is electrically connected to the controller to transmit the assist control signal via the communication port.

12. The operating device according to claim 8, wherein
the controller includes a wireless communicator electrically connected to the controller to wirelessly transmit the assist control signal.

13. The operating device according to claim 1, further comprising:
an assist operating switch configured to receive a user assist operation input; and
a controller configured to generate an assist control signal based on the user assist operation input, wherein
the informing unit further includes a vibration unit,
the informing unit and the controller are provided to the base member, and
the vibration unit is provided above the controller.

14. The operating device according to claim 13, further comprising:
an electric power source, wherein
the controller includes a wireless communicator electrically connected to the controller to wirelessly transmit the assist control signal, and
the electric power source is configured to supply electricity to the wireless communicator.

15. The operating device according to claim 14, wherein
the vibration unit is provided above the electric power source.

* * * * *